(12) United States Patent
Touimi et al.

(10) Patent No.: US 6,807,526 B2
(45) Date of Patent: Oct. 19, 2004

(54) METHOD OF AND APPARATUS FOR PROCESSING AT LEAST ONE CODED BINARY AUDIO FLUX ORGANIZED INTO FRAMES

(75) Inventors: Abdellatif Benjelloun Touimi, Trebeurden (FR); Yannick Mahieux, Tonquedec (FR); Claude Lamblin, Perros-Guirec (FR)

(73) Assignee: France Telecom S.A., Paris (FR)

( * ) Notice: Subject to any disclaimer, the term of this patent is extended or adjusted under 35 U.S.C. 154(b) by 380 days.

(21) Appl. No.: 09/731,776

(22) Filed: Dec. 8, 2000

(65) Prior Publication Data

US 2001/0027393 A1 Oct. 4, 2001

(30) Foreign Application Priority Data

Dec. 8, 1999 (FR) .................................. 99 15574

(51) Int. Cl.[7] .............................................. G10L 19/00
(52) U.S. Cl. ..................... 704/222; 704/205; 704/208
(58) Field of Search ................................. 704/205, 208, 704/222

(56) References Cited

U.S. PATENT DOCUMENTS 5,570,363 A * 10/1996 Holm ........................ 370/260
5,699,482 A * 12/1997 Adoul et al. ................ 704/219
6,008,838 A * 12/1999 Iizawa ..................... 348/14.09
6,134,520 A * 10/2000 Ravishankar ............... 704/222
6,230,130 B1 * 5/2001 Castello Da Costa et al. ... 704/258

* cited by examiner

Primary Examiner—Susan McFadden
(74) Attorney, Agent, or Firm—Lowe Hauptman Gilman & Berner, LLP

(57) ABSTRACT

At least one coded binary audio flux organized into frames is created from digital audio signals which were coded by transforming them from the time domain into the frequency domain. Transform coefficients of the signals in the frequency domain are quantized and coded according to a set of quantizers. The set is determined from a set of values extracted from the signals. The values make up selection parameters of the set of quantizers. The parameters are also present in the frames. A partial decoding state decodes then dequantizes transform coefficients produced by the coding based on a set of quantizers determined from the selection parameters contained in the frames of the coded binary audio flux or of each coded binary audio flux. The partially decoded frames are subjected to processing in the frequency domain. The thus-processed frames are then made available for use in a later utilization step.

32 Claims, 4 Drawing Sheets

METHOD OF AND APPARATUS FOR PROCESSING AT LEAST ONE CODED BINARY AUDIO FLUX ORGANIZED INTO FRAMES

FIELD OF INVENTION

The present invention relates to a method of and apparatus for processing at least one coded binary audio stream organized into frames. This or these streams are obtained by, on the one hand, frequency type coding algorithms using psychoacoustic characteristics of the human ear to reduce throughput and, on the other hand, a quantization of the thus-coded signals. The invention is particularly applicable when no bit allocation data implemented during the quantization is explicitly present in the audio streams considered.

BACKGROUND ART

One of the main problems to be resolved in processing coded audio streams is reducing the computing cost for such processing. Generally, such processing is implemented in the time domain so it is necessary to convert audio streams from the frequency domain to the time domain then, after processing the time streams, convert back from the time domain to the frequency domain. These conversions cause algorithmic times and greatly increase computing costs, which might be onerous.

In particular, in the case of teleconferencing, attempts have been made to reduce overall communication time and thus increase its quality in terms of interactivity. The problems mentioned above are even more serious in the case of teleconferencing because of the high number of accesses that a multipoint control unit might provide.

For teleconferencing, audio streams can be coded using various kinds of standardized coding algorithms. Thus, the H.320 standard, specific to transmission on narrow band ISDN, specifies several coding algorithms (G.711, G.722, G.728). Likewise, standard H.323 so specifies several coding algorithms (G.723.1, G.729 and MPEG-1).

Moreover, in high-quality teleconferencing, standard G.722 specifies a coding algorithm that operates on a 7 kHz bandwidth, subdividing the spectrum into two subbands. ADPCM type coding is then performed for the signal in each band.

To solve the problem and the complexity introduced by the banks of quadrature mirror filters, at the multipoint control unit level, Appendix I of Standard G.722 specifies a direct recombination method based on subband signals. This method consists of doing an ADPCM decoding of two samples from the subbands of each input frame of the multipoint control unit, summing all the input channels involved and finally doing an ADPCM coding before building the output frame.

One solution suggested to reduce complexity is to restrict the number of decoders at the multipoint control unit level and thus combine the coded audio streams on only a part of the streams received. There are several strategies for determining the input channels to consider. For example, combination is done on the N' signals with the strongest gains, where N' is predefined and fixed, and where the gain is read directly from input code words. Another example is doing the combining only on the active streams although the number of inputs considered is then variable.

It is to be noted that these approaches do not solve the time reduction problem.

SUMMARY OF THE INVENTION

The purpose of this invention is to provide a new and improved method of and apparatus for processing at least one coded binary audio stream making it possible to solve the problems mentioned above.

Such a process can be used to transpose an audio stream coded at a first throughput into another stream at a second throughput. It can also be used to combine several coded audio streams, for example, in an audio teleconferencing system.

A possible application for the process of this invention involves teleconferencing, mainly, in the case of a centralized communication architecture based on a multipoint control unit (MCU) which plays, among other things, the role of an audio bridge that combines (or mixes) audio streams then routes them to the terminals involved.

It will be noted, however, that the method and apparatus of this invention can be applied to a teleconferencing system whose architecture is of the mesh type, i.e., when terminals are point-to-point linked.

Other applications might be envisaged, particularly in other multimedia contexts. This is the case, for example, with accessing database servers containing audio objects to construct virtual scenes.

Sound assembly and editing, which involves manipulating one or more compressed binary streams to produce a new one is another area in which this invention can be applied.

Another application for this invention is transposing a stream of audio signals coded at a first throughput into another stream at a second throughput. Such an application is interesting when there is transmission through different heterogeneous networks where the throughput must be adapted to the bandwidth provided by the transmission environment used. This is the case for networks where service quality is not guaranteed (or not reliable) or where allocation of the bandwidth depends on traffic conditions. A typical example is the passage from an Intranet environment (Ethernet LAN at 10 Mbits/s, for example) where the bandwidth limitation is less severe, to a more saturated network (Internet). The new H.323 teleconferencing standard allowing interoperability among terminals on different kinds of networks (LAN for which QoS is not guaranteed, NISDN, BISDN, GSTN, . . . ) is another application area. Another interesting case is when audio servers are accessed (audio on demand, for example). Audio data are often stored in coded form but with a sufficiently low compression rate to maintain high quality, since transmission over a network might need another reduction in throughput.

The invention thus concerns a method of and apparatus for processing at least one coded binary audio stream organized as frames formed from digital audio signals which were coded by first converting them from the time domain to the frequency domain in order to calculate transform coefficients then quantizing and coding these transform coefficients based on a set of quantizers determined from a set of selection parameters that are used to select said quantizers, said selection parameters being also present in the frames.

Said method comprises: 1) a step of recovering the transform coefficients which comprises a decoding step and a dequantifying step for decoding and then dequantify the frames based on a set of quantifiers as determined from said selection parameters included in said frames of at least said coded binary audio stream, 2) a step of processing the transform coefficients thus recovered in the frequency domain and, 3) a step of supplying the processed frames to a subsequent utilization step.

According to a first implementation mode, the subsequent utilization step, called recoding step, partially recodes the frames thus processed in a step involving requantization and then recoding of the thus-processed transform coefficients.

According to another characteristic of the invention, the processing step 2) involves summing the transform coefficients produced by the recovering step 1) from the different audio streams and said recoding step involves requantizing, and then recoding the summed transform coefficients.

This described process can be performed in processing stages of a multi-terminal teleconferencing system. In such a case, The processing step 2) involves summing the transform coefficients produced by the recovering step 1) from the different audio streams, said recoding step involves, for a given terminal, subtracting the transform coefficient from said terminal to the summed transform coefficients, and requantizing and then recoding the resulting transform coefficients.

According to another implementation mode of the invention, the subsequent utilization step is a frequency domain to time domain conversion step for recovering the audio signal. Such a conversion process is performed, for example, in a multi-terminal audioconferencing system. The processing step involves summing the transform coefficients produced by the partial decoding of the frame streams coming from said terminals.

According to another characteristic of the invention, the values of the selection parameters of a set of quantizers are subjected to the processing step.

When the selection parameters of the set of quantizers contained in the audio frames of the stream or of each stream represent energy values of audio signals in predetermined frequency bands (the set of these values is called the spectral envelope), the said processing step includes, for example, summing the transform coefficients respectively produced by the recovering step of the different frame streams and supplying, re-coding step, the result of the said summation. The total energy in each frequency band is then determined by summing the energies of the frames and providing, at the recoding stage, the result of the summation.

When implemented in a multi-terminal audioconferencing system, the processing step involves (1) summing the transform coefficients produced by the partial decoding of each of the frame streams respectively coming from the terminals and (2) supplying to the recoding step associated with a terminal the result of the summing, (3) subtracting to this summing the transform coefficients produced by the partial decoding of the frame stream coming from the said terminal, (4) determining the total energy in each frequency band by summing the energies of the frames coming from the terminals, and (5) supplying to the recoding step associated with a terminal the result of the summation from which the energy indication derived by the frame coming from the said terminal is subtracted.

According to another characteristic of the invention, in which the audio frames of the stream or of each stream contain information about the voicing of the corresponding audio signal, the processing step then determines voicing information for the audio signal resulting from the processing step. To determine this voicing information for the audio signal resulting from the processing step, if all the frames of all the streams have the same voicing state, the processing step considers this voicing state as the audio signal state resulting from the processing step. To determine this voicing information for the audio signal resulting from the processing, if all the frames of all the streams do not have the same voicing state, the processing step determines the total energy of the set of audio signals of the voicing frames and the energy of the set of audio signals of the unvoiced frames and considers the voicing state of the set with the greatest energy as being the voicing state of the audio signal resulting from such processing step.

When the audio frames of the stream or of each stream contain information about the tone of the corresponding audio signal, the processing determines if all the frames are of the same kind. In such a case, information about the tone of the audio signal resulting from the processing is indicated by the state of the signals of the frames.

According to another characteristic of the invention, there is a search among all the frames to be processed for the frame with the greatest energy in a given band. The coefficients of the output frame are made equal to the coefficient of the frame in said band if the coefficients of input frames other than the one with the greatest energy in a given band are masked by a masking threshold of the frame in said band. The energies of the output frame in the band are, for example, made equal to the greatest energy of the input frame in said band.

According to another characteristic of the invention, when the requantization step is a vector quantization step using embedded dictionaries, the codeword of an output band is chosen equal to the codeword of the corresponding input band, if the dictionary related to the corresponding input band is included in the dictionary selected for the output band. In the opposite case, i.e., when the dictionary selected for the output band is included in the dictionary related to the input band, the codeword for an output band is still chosen equal to the codeword of the corresponding input band, if the quantized vector for the output band belongs also to the dictionary related to the input band, else the quantized vector related to the corresponding input band is dequantized and the dequantized vector is requantized by using the dictionary selected for the output band.

For example, the requantization step is a vectorial quantization with embedded dictionaries; the dictionaries are composed of a union of permutation codes. Then, if the corresponding input dictionary for the band is included in the selected output dictionary, or in the opposite case where the output dictionary is included in the input dictionary but the quantized vector, an element of the input dictionary, is also an element of the output dictionary, the code word for the output band is set equal to the code word for the input band. Otherwise reverse quantization, then requantization, in the dictionary process is performed. The requantization procedure is advantageously sped up in that the closest neighbor of the leader of a vector of the input dictionary is a leader of the output dictionary.

The characteristics of the above-mentioned invention, and others, will become clearer upon reading the following description of preferred embodiments of the invention as related to the attached drawings.

DETAILED DESCRIPTION OF THE DRAWING

Figure 1:
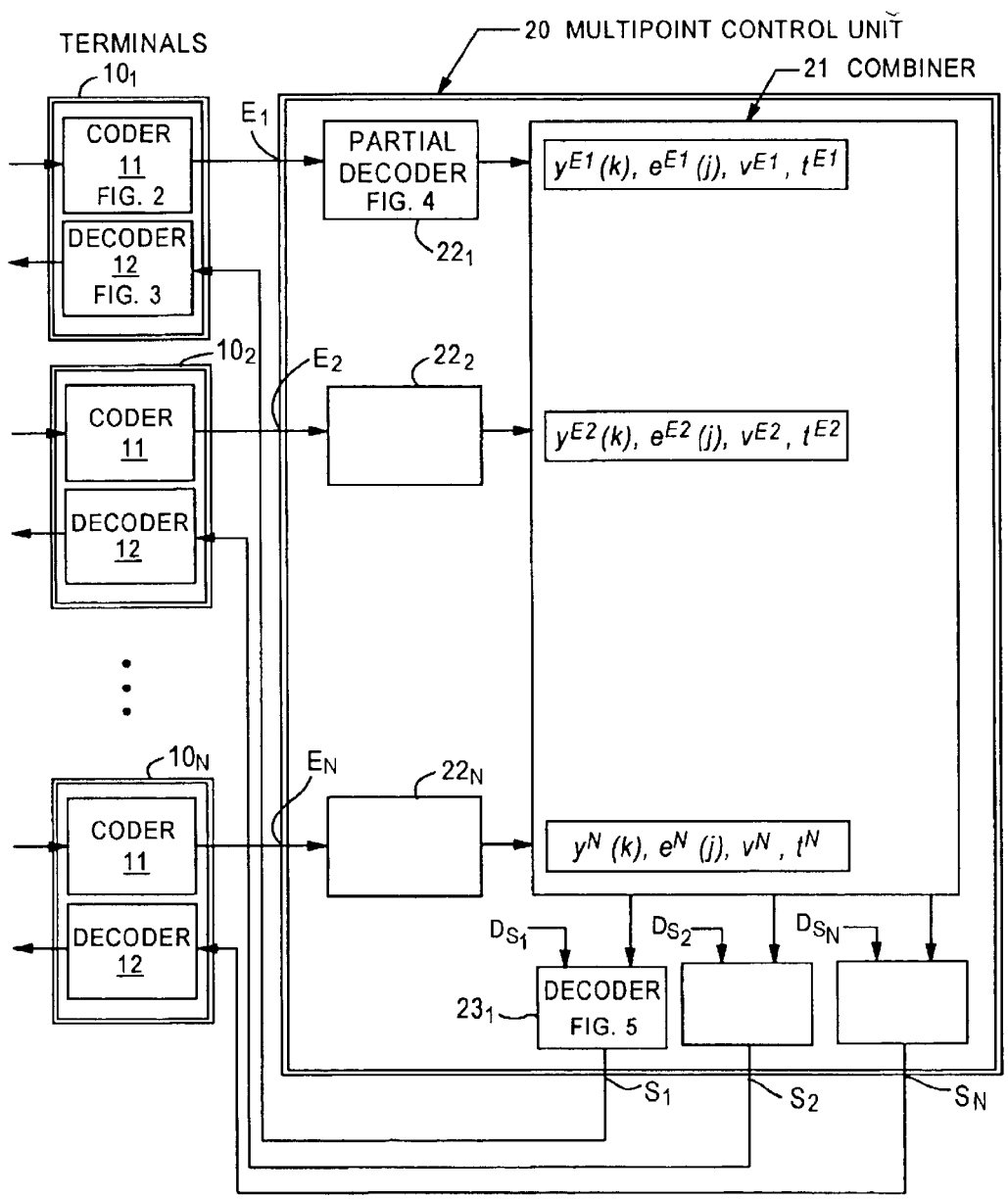
FIG. 1 is a block diagram of a centralized architecture teleconferencing system for performing a process according to a preferred embodiment of this invention.

The audioconferencing system shown in FIG. 1 is essentially made up of N terminals $10_1$ to $10_N$ respectively connected to a multipoint control unit (MCU) 20.

More precisely, each terminal 10 is made up of a coder 11 whose input receives audio data to transmit to the other terminals and whose output is connected to an input of multipoint control unit 20. Each terminal 10 also has a decoder 12 whose input is connected to an output of multipoint control unit 20 and whose output delivers data which is transmitted to the terminal considered by the other terminals.

Figure 2:
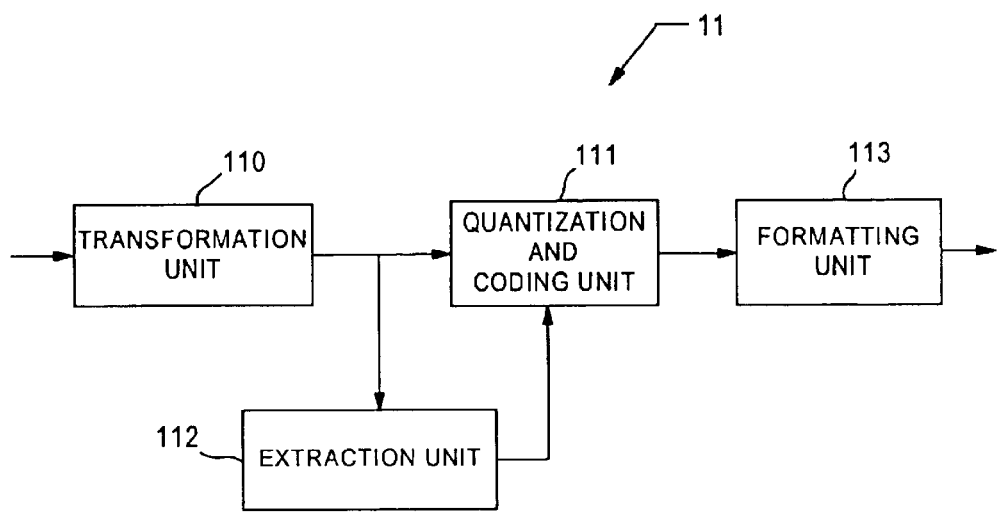
FIG. 2 is a block diagram of a coding unit in the frequency domain that makes use of the psychoacoustic characters of the human ear.

Generally, a coder 11, such as the one shown in FIG. 2, is of the perceptual frequency type. It thus has, on the one hand, a unit 110 used to convert input data from the time domain to the frequency domain and, on the other hand, a quantization and coding unit 111 to quantize and code the coefficients produced by the conversion performed by unit 110.

Generally, quantization is performed based on a set of quantizers, each quantizer depending, for example, on a certain number of values which are extracted, by unit 112, from the signals to be coded. These values are selection parameters for selecting the set of quantizers.

Finally, the quantized and coded coefficients are formatted into audio frames by unit 113.

As will be seen below, coder 11 may also deliver data on the values making up the quantizer selection parameters. These values might relate to the energies of audio signals in predetermined frequency bands, forming all together a spectral envelope of input audio signals.

Coder 11 might also emit voicing and tone information data, but does not deliver explicit information concerning the quantizers used by the quantization and coding process performed by unit 111.

Decoder 12 of each terminal 10 performs the opposite operations to those performed by coder 11. Decoder 12 thus dequantizes (a reverse quantization operation) the coefficients contained in the audio frames received from multipoint control unit 20 and then performs the reverse conversion to that performed by coder 11 so as to deliver data in the time domain. The dequantization stage requires a knowledge of the quantizers used in the quantization process, this knowledge being provided by the values of the selection parameters present in the frame. Decoder 12 can also use voicing and tone information from data received from multipoint control unit 20.

Multipoint control unit 20 shown in FIG. 1 is essentially made up of a combiner 21 which combines signals present on its inputs and delivers to the input of decoder 12 of a terminal a signal representing the sum of the signals delivered respectively by all coders 11 of the N terminals except for the signal from terminal $10_m$, where m is any one of terminals 1 . . . N.

More precisely, multipoint control unit 20 also has N partial decoders $22_1$ to $22_N$ intended to respectively receive the audio frames produced by terminals $10_1$ to $10_N$, to decode them and thus deliver them to the inputs of combiner 21. Multipoint control unit 20 has N partial recoders $23_1$ to 23N having outputs respectively connected to the inputs of decoders 12 of terminals $10_1$ to $10_N$ and having inputs connected to outputs of combiner 21.

The decoding performed by each decoder 22 is a partial decoding essentially involving extracting the essential information contained in the audio frames present on its input and thus delivering the transform coefficients in the frequency domain.

Each decoder 22 may also delivers to combiner 21 a set of values for quantizer selection parameters, such as the spectral envelope, and voicing and tone information.

To simplify things, in the rest of the description, we will consider only the spectral envelope but it will be understood that this invention also applies to any kind of set of parameter values allowing the quantizers to be used or used by the process involved to be selected.

The following notations are used in FIG. 1: $y^{E_m}(k)$ is the transform coefficient of rank k of the frame present on input $E_m$ connected to terminal $10_m$; $e^{E_m}(j)$ is the energy of the audio signal corresponding to the frame which is present on input $E_m$ in the frequency band with index j; $v^{E_m}$ is the voicing information for this signal; and $t^{E_m}$ is the tone information for this signal. The set of energies $e^E(j)$ for all bands varying from 1 to M, M being the total number of bands, the "spectral envelope" is noted $\{e(j)\}$.

In the prior art, decoders 22 decode the audio frames coming from terminals $10_1$ to $10_n$ and process them in order to synthesize a time signal which is then processed in the time domain by combiner 21. In combiner 21 of FIG. 1, combiner 21 processes its input signal in the frequency domain. In fact, combiner 21 of FIG. 1 recombines dequantized frames coming from decoders $22_1$ to $22_N$ by summing all the transform coefficients: $y^{E_m}(k)$ with $i \neq m$ and by delivering, on each output $S_m$, new dequantized coefficients $y^{S_m}(k)$, the value of which is given by the following relation:

$$y^{S_m}(k) = \sum_{i=1, i \neq m}^{N} y^{E_i}(k)$$

If the audio frame delivered by decoders $22_1$ to $22_N$ contains a spectral envelope signal $\{e(j)\}$, combiner 21 calculates, for each output $S_m$, a new spectral envelope signal $\{e^{S_m}(j)\}$ by recalculating the energy $\{e^{S(j)}\}$ 691 for each band j using the following relation:

$$e^{S_m}(j) = \sum_{i=1, i \neq m}^{N} e^{E_i}(j)$$

Combiner 21 may determine the parameters used to choose the type of coding and the characteristics of the quantization of the spectral envelope $\{e^{S_m}(j)\}$.

Moreover, the voiced/unvoiced nature and the tone/non-tone nature of each frame to be delivered on each output $S_m$ are determined based on the voicing and the energy of the signals corresponding to the fields present on inputs $E_1$ to $E_N$ which were used to build up them.

Partial recoders $23_1$ to $23_N$ proceed in the reverse manner to that of partial decoders $22_1$ to $22_N$, eventually taking into account the new binary throughput $D_{S^m}$ necessary for the channel m considered.

Figure 3:
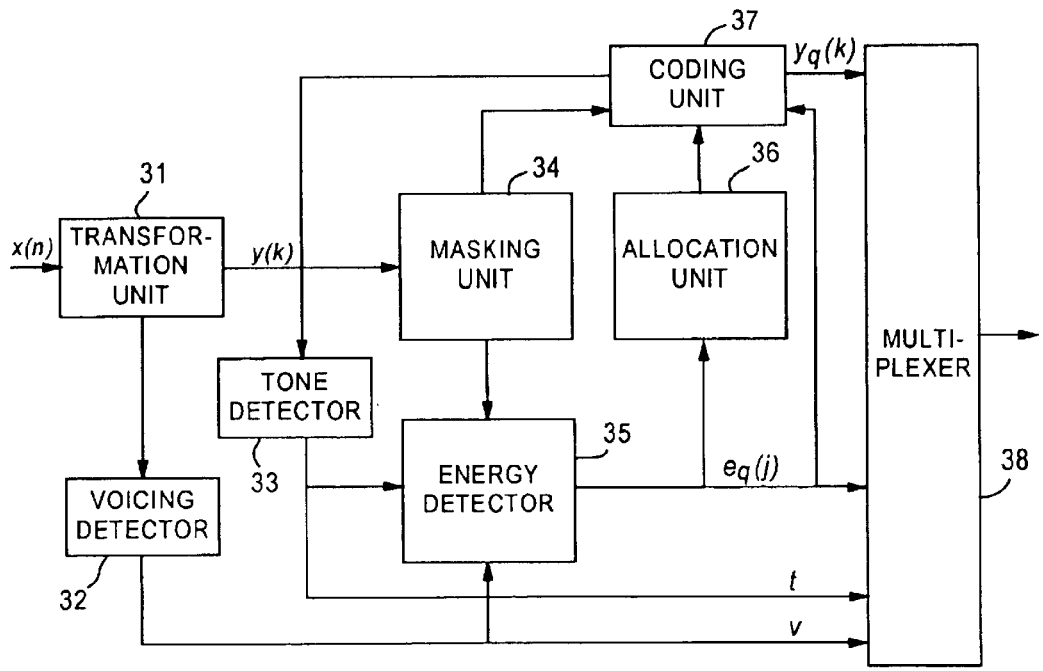
FIG. 3 is a block diagram of a coding unit used in a coded audio signals source, such as a teleconferencing system terminal.

FIG. 3 is a block diagram of a coder of a type that can be used as coder 11 of a terminal 10. It will be understood that this invention is not limited to this type of coder but that any type of audio coder capable of delivering transform coefficients and quantizer selection parameters would be suitable, such as the coder standardized by the ITU-T under the name "G-722" or the one standardized by the ISO under the name "MPEG-4 AAC". The description that follows is presented only as an embodiment.

The frames x(n) present at the input to the coder of FIG. 3 are initially transformed in unit 31 from the time domain to the frequency domain. Unit 31 is typically a modified discrete cosine transform for delivering the coefficients, y(k), of this transform. The coder of Fig. 3 also includes a voicing detector 32 which determines if the input signal is voiced or not and delivers binary voicing information v. It also includes a tone detector 33 which evaluates, based on the transform coefficients delivered by unit 31, whether the input signal x(n) is tonal or not and delivers binary tone information t. It also has a masking unit 34 which, based on transform coefficients delivered by unit 31, delivers or does not deliver masking information according to their value at compared with a predetermined threshold level.

Based on this masking information delivered by unit 34 as well as on voicing signal v and tone signal t, a unit 35 determines the energy e(j) in each of the bands j of a plurality of the bands (generally numbering 32) and delivers, quantized and coded, a spectral envelope signal for the current frame, subsequently noted by the fact that it is quantized, $\{e_q(j)\}$ with j=1 to M, M being the total number of bands.

Then, for the frequency bands that are not entirely masked, bits are dynamically allocated by unit 36 for the purpose of quantizing transform coefficients in a quantization and coding unit 37.

Bit allocation unit 36 uses the spectral envelope delivered by unit 35.

The transformed coefficients are thus quantized in unit 37 which, to achieve this and to reduce the dynamic domain of the quantization, uses the coefficients coming from unit 31, the masking information delivered by unit 34 and the spectral envelope $\{e_q(j)\}$ delivered by unit 35 and the bit allocation signal delivered by unit 36.

The quantized transformed coefficients $y_q(k)$, the quantized energy in each band $e_q(j)$, the tone signal t and the voicing signal v are then multiplexed in a multiplexer 38 to form coded signal audio frames.

Figure 4:
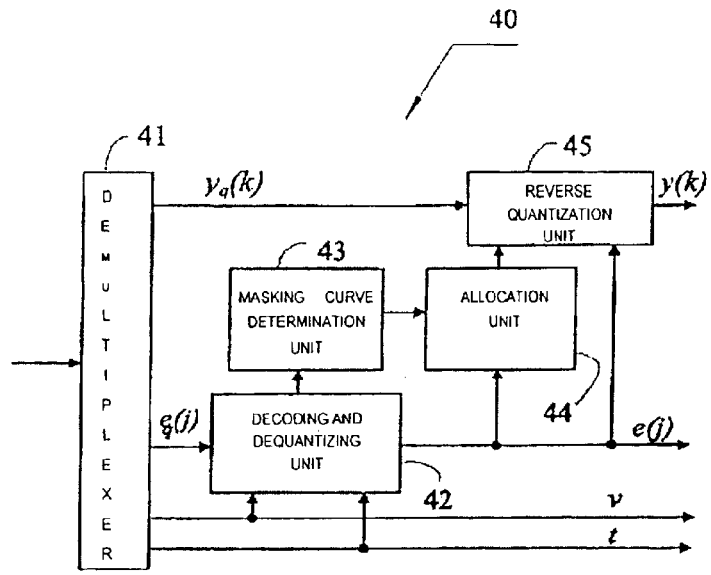
FIG. 4 is a block diagram of a partial decoding unit for performing a process according to a preferred embodiment of this invention.

FIG. 4 is a block diagram of a partial decoder 40 which is used as decoder 22 of a multipoint control unit 20, in the case where a coder such as the one shown in FIG. 3 is used at the terminal level.

The partial decoder 40 shown in FIG. 4 is essentially made up of a demultiplexer 41 for demultiplexing input frames and thus delivering the quantized coefficients $y_q(k)$, the energy in each of the bands $e_q(j)$, the voicing information signal v and the tone information signal t.

The energy signal $e_q(j)$ in each of the bands is decoded and dequantized in a unit 42 that uses voicing information signals v and tone information signals (to achieve this. Unit 42 derives a signal representing the energy e(j) in each of bands j.

A masking curve by band is determined by unit 43 and is used by a dynamic bit allocation unit 44 which moreover uses the energy signal e(j) in each of bands j to deliver a dynamic bit allocation signal to a reverse quantization unit 45. Reverse quantization unit 45 dequantizes each of the transform coefficients $y_q(k)$ and uses the energy signal e(j) in each of the corresponding bands.

Thus, the partial decoder delivers, for each frame on its input, the transform coefficients y(k), the energy signals e(j) in each of the bands, a voicing information signal v and a tone information signal t.

The partial decoding unit 40 makes available, for each frame of the channel with index n to be combined, the set of K quantized transform coefficients with index k quantized $\{y_q^{E_n}(k)\}$ with k=1 to K, of the set $\{e_q^{E_n}(j)\}$ of quantized energy values in the M bands j with j=1 to M, tone information $t^{E_n}$ and voicing information $v_E^n$.

Combiner 21 is used, for an input with index n, to combine the N-1 other inputs and deliver the signal resulting from this combination to the output with index n.

More precisely, the combination operation performed by combiner 21 is advantageously the following.

First of all, intermediate variables corresponding to the sum of the transformed coefficients with index k $y^{E_n}(k)$ for all inputs $E_n$ and the sum of energies $e^{E_n}(j)$ of the quantized energy values in each band j for all inputs $E_n$ are determined with:

$$y(k) = \sum_{n=1}^{N} y^{En}(k), k = 0 \ldots K-1$$

$$e(j) = \sum_{n=1}^{N} (e^{En}(j))^2, j = 0 \ldots M-1$$

Then, the values corresponding to each output channel $S_m$ are subtracted from the intermediate variables y(k) and e(j), of the input signals for the input with index m:

$y_q^{Sm}(k) = y(k) - y^{Em}(k), k=0 \ldots K-1$ and $m=1 \ldots N$ $e_q^{Sm}(j) = \sqrt{e(j) - (e^{Em}(j))^2}, j=0 \ldots M-1$ and $m=1 \ldots N$ The number of bands M and the number of transformed coefficients K used in the above calculations depend on the throughput of the output channel considered. Thus, for example, if the bit rate for a channel is 16 kbits/s, the number of bands is equal to M=26 instead of 32.

Combiner 21 also determines the voicing $v^{S_m}$ of the field on each output Sm. To achieve this, combiner 21 uses the voicing state $v^{Em}$ of the frames of the N-1 inputs with indexes n (n≠m) and of their energy $e^{E_n}$. Thus, if all the frames on input channels with indexes n (n≠n) are of the same kind (voiced or not voiced), the field on the output channel with index m is considered to be in the same state. However, if the input frames are not of the same kind, then the total energy of the set of voiced frames and the total energy of the set of unvoiced frames are calculated independently from each other. Then, the state of the output frame with index m is the same as that of the group of frames of which the total energy thus calculated is the greatest.

The calculation for the energy of each input frame is done simply by combining the energies of its bands obtained from the decoded spectral envelope.

Combiner 21 also determines the tone $t^{S_m}$ of the field of each output $S_m$ if all the input frames with index n contributing to the calculation of the frame on output channel with index m are of the same kind. In this particular case, the output frame with index m takes the same tone state. Otherwise, tone determination is postponed until the partial recoding phase.

Figure 5:
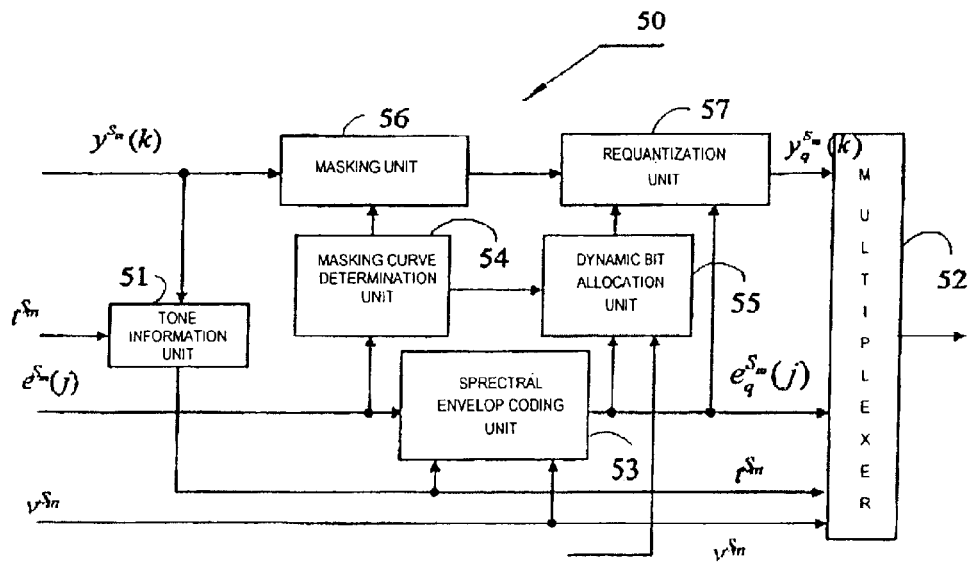
FIG. 5 is a block diagram of a partial recoding unit used for a process according to a preferred embodiment of this invention.

FIG. 5 is a block diagram for a partial recoding unit 50 which may be used when a coder such as coder 23 shown in FIG. 3 is used in multipoint control unit 20.

The partial recoder 50 shown in FIG. 5 delivers to each output $S_m$ of a multi-point control unit 20 transformed coefficients $y_q^{S_m}(k)$, energy signals $e_q^{S_m}(j)$ in j bands, a tone information signal $t^{S_m}$ and a voicing information signal $v^{S_m}$.

The tone information signal $t^{S_m}$ on the output with index m is recalculated using a unit 51 which receives, on a first input, the tone information signal $t^{S_m}$ from the output with index m when the signal has been determined by combiner 21 and, on a second input, all the transformed coefficients $y_q^{S_m}(k)$ for a new calculation when combiner 21 has not done this.

The tone information signal $t^{S_m}$ coming from unit 51 is delivered on an input of a multiplexer 52. It is also delivered to a spectral envelop coding unit 53 which also uses the voicing signal $v^{S_m}$ on output $S_m$ of multipoint control unit 20 to code and quantize the energies in all the bands considered $e_q^{S_m}(j)$. The quantized energy signals $e_q^{S_m}(j)$ are delivered to an input of multiplexer 52.

The (unquantized) energy signals $e^{S_m}(j)$ are also used by a masking curve determination unit 54 which provides masking signals by bands j to a dynamic allocation unit 55 and to a masking unit 56.

Dynamic bit allocation unit 55 also receives quantized energy signals $e_q^{Sm}(j)$ and determines the number of bits requantization unit 57 uses to quantize the transform coefficients $y_q^{Sm}(k)$ that were not masked by masking unit 56 and to deliver quantized transform coefficient signals $y_q^{Sm}(k)$ to multiplexer 52. Requantization unit 57 also uses the quantized energy signals $e_q^{Sm}(j)$ in bands j.

Multiplexer 52 delivers the set of these signals in the form of an output frame.

To reduce the complexity due to the reverse vector quantization performed by unit 45 of each decoder 40 and to the requantization of the bands when recoder 50 operates, particularly of unit 57 of recoder 50, an intersignal masking method is used in bands j to keep, if possible, only the coefficients and the energy of a single input signal in a given band. Thus, to determine the signal on band j, j=1 to M, of the frame present on the output with index m, all the input frames n≠m are first searched to find the one with the greatest energy $(e^{En}(j))^2$ in band j:

$$n0 = \arg\max_{n \neq m}\{(e^{En}(i))^2\}$$

Then a test is made to determine whether the coefficients for inputs frames $y^{Em}(k)$ where (n≠n) and n≠$n_0$ in band j are all masked by the masking threshold $S^{En_0}(j)$ for frame $n_0$ in band j. It will be noted that this threshold $S^{En_0}(j)$ was determined during the partial decoding phase performed by unit 44 of decoder 40.

Thus, if coefficients $y^{Em}(k)$ are masked by threshold $S^{En_0}(j)$, that is:

If$(y^{En}(k))^2 < S^{En_0}(j) \; \forall n \neq m, n_0 et \; \forall k \in$ bande$(j)$ then:

the coefficients $y^{Sm}(k)$ of the output frames are equal to coefficient $y^{En_0}(k)$ of the input frame $n_0$, that is:

$y^{Sm}(k) = y^{En}_0(k)$ for $k \in$ band$(j)$

Likewise, in this case, the energy $e^{Sm}(j)$ of each band of output frame m is equal to the greatest energy $e^{En}_0(j)$, that is:

$e^{Em}(j) = e^{En_0}(j)$

The coefficients for the bands of output frame m thus calculated are not subjected to a complete inverse quantization requantization procedure during the partial recoding phase.

If the above condition is not satisfied, the terms $e^{Sm}(j)$ and $y^{Sm}(k)$ are given by the preceding equations.

When a algebraic type vector quantization is used to requantize the transformed coefficients, code word m, transmitted for each band i of the input frame represents the index of the quantized vector in the dictionary, noted $C(b_i, d_i)$, of leader vectors quantized by the number of bits $b_i$ and of dimension $d_i$. From this code word $m_i$, the signs vector sign (i), the number $L_i$, in the dictionary $C(b_i, d_i)$, of the quantized leader vector which is the closest neighbor of leader vector $\tilde{Y}(i)$ and the rank $r_i$ of the quantized vector Yq(i) in the class of the leader vector $\tilde{Y}q(i)$ can be then extracted.

Recoding of band i, to obtain the output code word $m_i'$ then takes place as follows.

Code word $m_i$ in band i is decoded and the number $L_i$ of the quantized leader vector $\tilde{Y}q(i)$, the rank word $r_i$ and the sign sign (i) are extracted. Two cases are to be considered depending on the number of bits $b_i$ and $b'_i$, respectively, allocated to band i on input and output as well as the position of the input quantized leader vector compared to the new dictionary $C(b_i', d_i)$.

If the number of output bits $b'_i$ is greater than or equal to the numbers of input bits $b_i$, then code word $m'_i$, of the output frame is the same as that of input frame $m_i$. The same is true if the number of output bits $b'_i$ is less than the number of input bits $b_i$, but at the same time, the number $L_i$ of the quantized leader vector $\tilde{Y}q(i)$ is less than or equal to the cardinal number NL ($b_i, d_i$) of the dictionary used to quantize the output frame. Thus:

If $(b_i' \geq b_i)$ or $(b_i' < b_i$ and $L_i \leq NL(b_i', d_i))$ then $m_{=mi}$ In all other cases, the frame is decoded to recover perm(i) (this is equivalent to determining Yq(i) from number $L_i$ and of rank $r_i$. This step may already have been carried out during the partial decoding operation.

Vector $\tilde{Y}'q(i)$ is then sought in dictionary $c(b_i', d_i)$, the closest neighbour of $\tilde{Y}q(i), L_i'$ being its number.

Following this, rank $r_i$ of $\tilde{Y}'q(i)$, the new quantized vector of Y(i), is sought in the class of the leader $\tilde{Y}'q(i)$ by using perm (i). Then code word $m_i$ of band i of the output frame is constructed using the number $L_i$, rank $r_i$ and sign (i).

Figure 6:
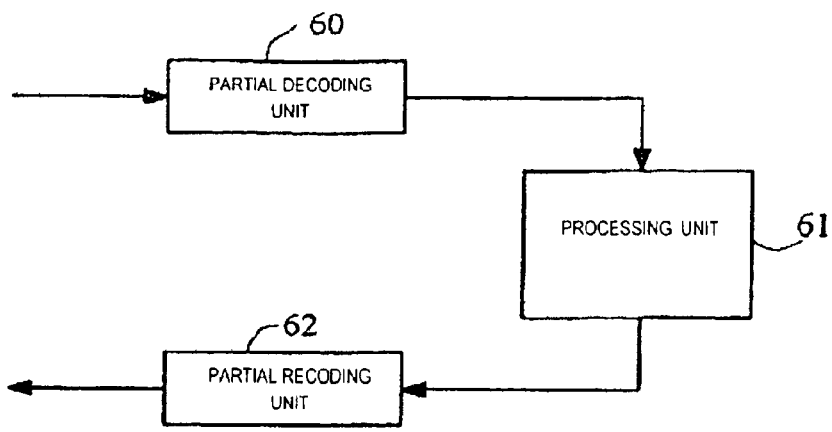
FIG. 6 is a block diagram of a processing unit for performing a process according to a preferred embodiment of this invention.

This invention can also be applied in any digital audio signal processing application. A block diagram of such an application is shown in FIG. 6.

The coded signals coming from a terminal, such as a terminal 10 (see FIG. 1), are subjected, in a unit 60, to partial decoding, such as that performed in a decoding unit 40 (see also FIG. 4). The signals thus partially decoded are then subjected, in a unit 61, to the particular processing to be applied. Finally, after processing, they are recoded in a unit 62 which is of the type of unit 50 which is illustrated in FIG. 5.

For example, the particular processing in question is an audio transcoding to bring audio signals coded t a first bit rate (for example, 24 kbits/s) to a second bit rate (for example, 16 kbits/s). In this particular case, the processing performed in unit 61 involves reallocating bits based on the second available bit rate. It will be noted that, in this case, the output frame from unit 62 contains the same lateral tone, voicing and coded spectral envelope information as in the frame present at the input to unit 60.

Figure 7:
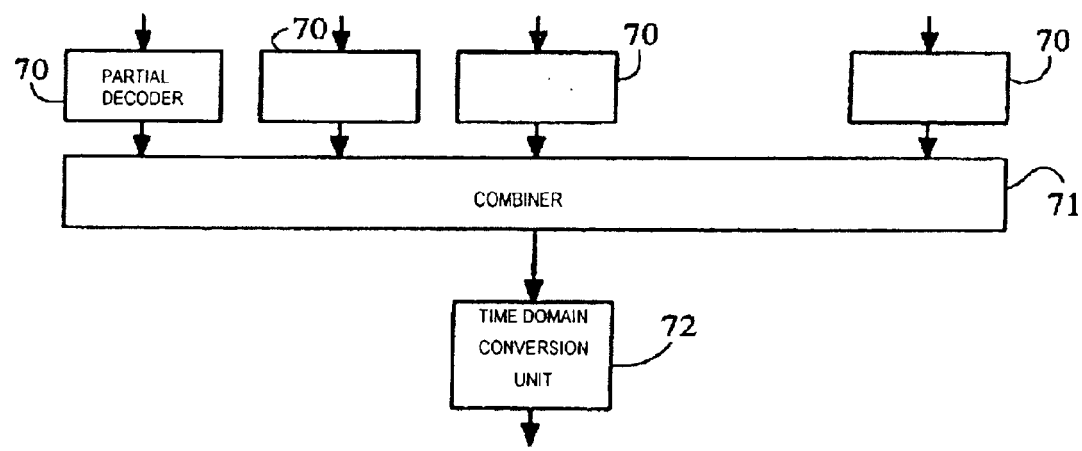
FIG. 7 is a block diagram of an interlinked architecture teleconferencing system for performing a process according to a preferred embodiment of this invention.

FIG. 7 is a block diagram of a teleconferencing terminal with an mesh architecture. The terminal of FIG. 7 includes a number of partial decoders 70 equal to the number of the inputs for the frames issued from other terminals. These partial decoders 70 have their outputs which are respectively connected to the inputs of a combiner 71 which then delivers a sum frame in the frequency domain. This frame is then converted to the time domain by a unit 72 which delivers a digital audio signal.

While there have been described and illustrated specific embodiments of the invention, it will be clear that variations in the details of the embodiments specifically illustrated and described may be made without departing from the true spirit and scope of the invention as defined in the appended claims.

What is claimed is:

1. A method of processing at least one coded binary stream organized in the form of frames created from digital audio signals which were coded by at least an audio terminal in order to output processed frames to a subsequent using step, said coding of said digital audio signals including calculating transform coefficients by transforming the digital audio signals from the time domain to the frequency domain, then quantizing and coding said transform coefficients according to a set of quantizers determined by selection parameters extracted from said digital audio signals, said frames including said selection parameters and the thus-coded transform coefficients, the method comprising, for said at least one audio stream received from at least said terminal:

(1) obtaining said selection parameters from said frames of said audio stream and determining from said selection parameters the set of quantizers that was used during the quantizing step performed by said audio terminal;

(2) recovering the transform coefficients that were calculated by said audio terminal by partially decoding and dequantizing said frames, the recovering being performed by using the set of quantizers determined in step (1);

(3) producing processed frames by performing said specific process in the frequency domain on the dequantized transform coefficients obtained in step (2); and (4) supplying said processed frames to a subsequent using step.

2. The method of claim 1 wherein said subsequent using step includes partially recoding the frames thus processed in a single step including requantization and recoding the processed transform coefficients.

3. The method of claim 2 wherein the specific process includes summing the dequantized transform coefficients obtained by the step (2) of partially decoding the frames belonging to streams of frames provided by a plurality of audio terminals.

4. Performing the method of claim 2 in a multi-terminal teleconferencing system wherein the specific process includes summing the dequantized transform coefficients obtained by the step (2) of partially decoding the frames belonging to streams of frames provided by a plurality of audio terminals, subtracting from said summed coefficients the dequantized transform coefficients obtained by the step (2) of partial decoding frames coming from one of said audio terminals, and supplying the thus obtained result to said subsequent using step concerning said audio terminal.

5. The method of claim 1 wherein said subsequent using step includes reconstructing an audio signal by transforming said processed frames from the frequency domain back in the time domain.

6. Performing the method of claim 5 in a multi-terminal teleconferencing system wherein the specific process includes summing the dequantized transform coefficients obtain by the step (2) of partially decoding the frames belonging to streams of frames provided by a plurality of audio terminals.

7. The method of claim 6 further including subjecting the values of the quantizer set selection parameters to said specific process of summing.

8. The method of claim 6 wherein the quantizer set selection parameters included in the audio frames of said at least one stream includes a set of values representing the energies of the audio signals in predetermined frequency bands, the set being called a spectral envelope, said method including summing the transformed coefficients produced by the step (2) of partially decoding each of the stream of frames and supplying the result of the summation to a subsequent using step of recoding, said method further including determining the total energy in each frequency band by summing the energies of the frames and supplying the result of the summing step to a subsequent using step of recoding.

9. Performing the method of claim 8 in a multi-terminal teleconferencing system, said method further including summing the transformed coefficients produced respectively by the step (2) of partially decoding the streams of frames coming from the said terminals and the recoding step associated with a terminal, supplying the result of said summation from which the transform coefficients produced by the step of partially decoding the stream of frames coming from said terminal are subtracted, determining the total energy in each frequency band by summing the energies of the frames coming from all the terminals, and, for the recoding step associated with a terminal, supplying the result of the summation from which the energy from the frame coming from the terminal is subtracted.

10. The method of claim 2 wherein the requantizing step of said subsequent using step is performed by a vectorial quantization with embedded dictionaries, further including setting the code word of an output band so it is the same as the codeword of an input band if the input dictionary corresponding to the band is included in the selected output dictionary; or if the output dictionary is included in the input dictionary but the quantized vector, an element of the input dictionary, is also an element of the output dictionary, performing a process including reverse quantization then requantization in the output dictionary.

11. The method of claim 10 wherein the requantization step includes a vectorial quantization with embedded dictionaries, the dictionaries including a union of permutation codes, said method further including setting the code word for the output band so it is the same as the code word for the input band if the corresponding input dictionary for the band is included in the selected output dictionary, or in the opposite case where the output dictionary is included in the input dictionary but the quantized vector, an element of the input dictionary, is also an element of the output dictionary, otherwise reverse quantizing then requantizing the output dictionary, the requantization procedure being sped up if the closest neighbor of a leader of a vector of the input dictionary is a leader of the output dictionary.

12. The method of claim 1 wherein the audio frames of said at least one stream include voicing information on the corresponding audio signal, said method further including determining voicing information for the audio signal resulting from the specific process.

13. The method of claim 12 further including, in the step of determining voicing information for the audio signal resulting from said performing step (3) of said specific process, (a) if all the frames of all the streams are determined to have the same voicing state, considering this voicing state as the audio signal state resulting from step (3), and (b) (i) if all the frames of all the streams are determined not to have the same voicing state, determining the total energy of the set of audio signals of the voiced frames and the energy of the set of audio signals of the unvoiced frames, and (ii) then considering the voicing state of the set with the greatest energy as being the voicing state of the audio signal resulting from the said specific process.

14. The method of claim 1 wherein the audio frames of said at least one stream include tone information for the corresponding audio signal, said specific process further including, if all the frames are determined to be of the same kind, determining tone information for the audio signal resulting from said specific process as being the state of the signals of all the frames.

15. The method of claim 1 further including finding among all the frames the one with the most energy in a given band, and making the coefficients of the output frame equal to the coefficient of the frame with the most energy in a given band if the coefficients of the input frames other than the one with the most energy in a given band are masked by a masking threshold of the frame in the band.

16. The method of claim 15 further comprising equalizing the energies of the output frame in the band to the maximum energy of the input frame in said band.

17. Apparatus for performing a specific process on at least one coded binary stream organized in the form of frames created from digital audio signals which were coded by at least an audio terminal to output processed frames to a subsequent using step, said coding of said digital audio signals including first transforming the digital audio signals from the time domain to the frequency domain in order to calculate transform coefficients, then quantizing and coding said transform coefficients according to a set of quantizers determined by selection parameters extracted from said digital audio signals, said frames including said selection parameters and the thus-coded transform coefficients, the apparatus comprising:

(1) a first stage for obtaining said selection parameters from said frames of at least one audio stream received from said at least one terminal and for determining from said selection parameters the set of quantizers used during the quantizing step performed by said audio terminal;

(2) a second stage for partially decoding and dequantizing said frames in response to the set of quantizers determined by said first stage and for recovering the transform coefficients calculated by said audio terminal;

(3) a third stage for performing said specific process in the frequency domain on the dequantized transform coefficients obtained by said second stage for producing processed frames; and (4) a fourth stage for supplying said frames processed by said third stage to a subsequent utilization stage.

18. The apparatus of claim 17 wherein said subsequent utilization stage includes a stage for partially recoding the frames thus supplied by said fourth stage in response to a requantization and a recoding of the processed transform coefficients.

19. The apparatus of claim 18 wherein the third stage includes a summing arrangement for summing the dequantized transform coefficients obtained by the second stage partially decoding the frames belonging to streams of frames derived at a plurality of audio terminals.

20. The apparatus of claim 18 for use in a multi-terminal teleconferencing system wherein the third stage includes a summing arrangement for summing the dequantized transform coefficients obtained by the second stage partially decoding the frames belonging to streams of frames derived at a plurality of audio terminals, a subtracting arrangement for subtracting from said summed coefficients the dequantized transform coefficients derived by the second stage partial decoding frames coming from one of said audio terminals, and an arrangement for supplying the thus obtained result to said subsequent utilization stage concerning said audio terminal.

21. The apparatus of claim 17 wherein said subsequent utilization stage includes a reconstructing arrangement for transforming said processed frames from the frequency domain back in the time domain.

22. The apparatus of claim 21 for use in a multi-terminal teleconferencing system wherein the third stage includes a summing arrangement for summing the dequantized transform coefficients derived by the second state partially decoding the frames belonging to streams of frames derived by a plurality of audio terminals.

23. The apparatus of claim 22 wherein the summing arrangement is arranged to process the values of the quantizer set selection parameters.

24. The apparatus of claim 22 wherein the set of quantizer selection parameters in the audio frames of said at least stream includes a set of values representing the energies of the audio signals in predetermined frequency bands, the set being called a spectral envelope, said apparatus including a summing arrangement for summing the transformed coefficients derived by the second stage partially decoding each of the stream of frames and for supplying the result of the summation to a subsequent recoding utilization stage, and an arrangement for determining the total energy in each frequency band in response to a sum of the energies of the frames and supplying the result of the summation to said subsequent recoding utilization stage.

25. The apparatus of claim 24 for use in a multi-terminal teleconferencing system, said apparatus further including a summing arrangement for summing the transformed coefficients derived respectively by the second state partially decoding the streams of frames coming from the said terminals and for supplying to a terminal the result of said summation from which the transform coefficients derived by partially decoding the stream of frames coming from said terminal are subtracted, an arrangement for determining the total energy in each frequency band in response to a sum of the energies of the frames coming from all the terminals and for providing to a terminal the result of the summation from which the energy from the frame coming from said terminals is subtracted.

26. The apparatus of claim 17 wherein the audio frames of said at least one stream include voicing information on the corresponding audio signal, said apparatus further including an arrangement for determining the voicing information for the audio-signal derived by said processing state.

27. The apparatus of claim 26 further including an arrangement (a) for determining voicing information for the audio signal derived by said third stage and an arrangement for considering this voicing state as the audio signal state if all the frames of all the streams are determined to have the same voicing state, or if all the frames of all the streams are determined not to have the same voicing state, (b) (i) for determining the total energy of the set of audio signals of the voiced frames and the energy of the set of audio signals of the unvoiced frames, and (ii) then for considering the voicing state of the set with the greatest energy as being the voicing state of the audio signal derived from the third stage.

28. The apparatus of claim 17 wherein the audio frames of said at least one stream include tone information for the corresponding audio signal, said third stage further including an arrangement for determining tone information for the audio signal derived by said third stage as being the state of the signals of all the frames if all the frames are determined to be of the same kind.

29. The apparatus of claim 17 further including an arrangement for finding among all the frames the frame with the most energy in a given band, and for making the coefficients of the output frame equal to the coefficient of the frame with the most energy in a given band if the coefficients of the input frames other than the one with the most energy in a given band are masked by a masking threshold of the frame in the band.

30. The apparatus of claim 29 further comprising an arrangement for equalizing the energies of the output frame in the band to the maximum energy of the input frame in said band.

31. The apparatus of claim 18 wherein the requantizing stage of said subsequent utilization stage is arranged to perform a vectorial quantization with embedded dictionaries, said apparatus further including means for either setting the code word of an output band so it is the same as the codeword of an input band if the input dictionary corresponding to the input band is included in the selected output dictionary, or if the output dictionary is included in the input dictionary but the quantized vector, an element of the input dictionary, is also an element of the output dictionary; or for performing a process including reverse quantization then requantization in the output dictionary.

32. The method of claim 31 wherein the dictionaries include a union of permutation codes, said apparatus further including means for either setting the code word for the output band so it is the same as the code word for the input band if the corresponding input dictionary for the band is included in the selected output dictionary, or in the opposite case where the output dictionary is included in the input dictionary but the quantized vector, an element of the input dictionary, is also an element of the output dictionary, or otherwise for reverse quantizing then requantizing the output dictionary, the requantization procedure being sped up in the closest neighbor of a leader of a vector of the input dictionary that is a leader of the output dictionary.

* * * * *